(12) United States Patent
Lu et al.

(10) Patent No.: US 8,972,976 B2
(45) Date of Patent: Mar. 3, 2015

(54) DEVICE AND METHOD FOR AUTOMATIC DRIVER INSTALLATION

(75) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 252 days.

(21) Appl. No.: 13/519,691

(22) PCT Filed: Nov. 24, 2011

(86) PCT No.: PCT/CN2011/082847
§ 371 (c)(1),
(2), (4) Date: Jun. 28, 2012

(87) PCT Pub. No.: WO2012/069000
PCT Pub. Date: May 31, 2012

(65) Prior Publication Data
US 2012/0291023 A1 Nov. 15, 2012

(30) Foreign Application Priority Data
Nov. 25, 2010 (CN) .......................... 2010 1 0566890

(51) Int. Cl.
  G06F 9/445 (2006.01)
  G06F 9/44 (2006.01)
(52) U.S. Cl.
  CPC .................................... G06F 9/4411 (2013.01)
  USPC ............................ 717/178; 717/174; 717/175
(58) Field of Classification Search
  None
  See application file for complete search history.

(56) References Cited

U.S. PATENT DOCUMENTS

| 6,023,585 A * | 2/2000 | Perlman et al. ................ 717/178 |
| 6,728,787 B1 * | 4/2004 | Leigh ............................ 719/327 |

(Continued)

FOREIGN PATENT DOCUMENTS

| CN | 1383063 A | 12/2002 |
| CN | 1655134 A | 8/2005 |

(Continued)

OTHER PUBLICATIONS

Andy Davis, USB—Undermining Security Barriers, [Online] 2011, An NGS Secure Research Publication, [Retrieved from the Internet] <https://www.nccgroup.com/media/18580/usb_-_undermining_security_barriers.pdf> 18 pages.*

(Continued)

*Primary Examiner* — Thuy Dao
*Assistant Examiner* — Ravi K Sinha
(74) *Attorney, Agent, or Firm* — Harness, Dickey & Pierce, P.L.C.

(57) ABSTRACT

Provided are a device and method for automatic driver installation. The device comprises: a remoter server, a client host and an information security device. The remote server stores driver and interface protocol program downloading service for the client host. The client host is in communication connection with the remote server, receives data information inputted by the information security device, and downloads the driver or interface protocol program from the remote server according to the data information and install or load the driver or interface protocol program. The information security device is in communication connection with the client host and feedbacks data information according to instruction issued by the client host. The present scheme can effectively reduce the number of times user account control (UAC) window pops up and ensure operating system security while installing and deploying middleware, thus simplifying user operation.

12 Claims, 2 Drawing Sheets

(56) References Cited

U.S. PATENT DOCUMENTS

| | | | |
|---|---|---|---|
| 7,316,022 B2* | 1/2008 | Nishio | 717/175 |
| 7,334,227 B2* | 2/2008 | Kim et al. | 717/178 |
| 7,415,707 B2* | 8/2008 | Taguchi et al. | 717/175 |
| 7,600,226 B2* | 10/2009 | Aiba et al. | 717/175 |
| 7,644,264 B1* | 1/2010 | Olsen | 717/178 |
| 7,668,974 B2* | 2/2010 | Ragnunath et al. | 717/178 |
| 7,739,429 B2 | 6/2010 | Shih | |
| 8,006,243 B2* | 8/2011 | Lum | 717/178 |
| 8,041,863 B2 | 10/2011 | Kwan et al. | |
| 8,056,072 B2* | 11/2011 | Andrews et al. | 717/174 |
| 8,099,502 B2* | 1/2012 | Genske et al. | 717/178 |
| 8,607,321 B2* | 12/2013 | Herskedal et al. | 726/9 |
| 2002/0161939 A1* | 10/2002 | Kim et al. | 710/8 |
| 2002/0174264 A1* | 11/2002 | Fuller et al. | 709/321 |
| 2003/0195951 A1* | 10/2003 | Wittel et al. | 717/176 |
| 2006/0037015 A1* | 2/2006 | Mihai | 717/174 |
| 2006/0136907 A1* | 6/2006 | Bennett et al. | 717/174 |
| 2007/0240156 A1* | 10/2007 | Nakata | 717/178 |
| 2008/0098138 A1* | 4/2008 | Lu et al. | 710/74 |
| 2008/0155531 A1* | 6/2008 | Yamada | 717/174 |
| 2008/0163350 A1* | 7/2008 | Lu et al. | 726/9 |
| 2009/0083651 A1* | 3/2009 | Kim et al. | 717/174 |
| 2010/0023777 A1* | 1/2010 | Prevost et al. | 713/180 |
| 2010/0174834 A1* | 7/2010 | Lowe et al. | 717/174 |
| 2011/0061046 A1* | 3/2011 | Phillips | 717/174 |
| 2012/0042309 A1* | 2/2012 | Risan | 717/175 |
| 2013/0111465 A1* | 5/2013 | Zhang | 717/175 |

FOREIGN PATENT DOCUMENTS

| | | |
|---|---|---|
| CN | 1996328 A | 7/2007 |
| CN | 101187878 A | 5/2008 |
| CN | 101425933 A | 5/2009 |
| CN | 102004655 A | 4/2011 |
| CN | 102004655 B | 6/2013 |

OTHER PUBLICATIONS

Jean-Daniel Aussel, Smart Cards and Digital Security, [Online] 2007, [Retrieved from the Inernet] <http://download.springer.com/static/pdf/575/chp%253A10.1007%252F978-3-540-73986-9_4.pdf> 15 pages.*

John Mallery, Portable Data Sorage Devices: Security Nightmare, [Online] 2006, [Retrieved from the Internet] <http://vldtyscrngweb.alpha.degdarwin.com/Resource_/WhitePaper/27/Portable-Data-Storage-Devices-Security-Nightmare.pdf> 4 pages.*

Dung Vu Pham, Ali Syed, and Malka N. Halgamuge, Universal serial bus based software attacks and protection solutions, [Online] 2011, Digit. Investig. 7, 3-4 (Apr. 2011), 172-184. , [Retrieved from the Internet] <http://www.sciencedirect.com/science/article/pii/S1742287611000041#>.*

Lu, H.K.; Ali, A.M.; Durand, S.; Castillo, L., A New Secure Communication Framework for Smart Cards, [Online] 2009, Consumer Communications and Networking Conference, 2009. CCNC 2009. 6th IEEE , vol., No., pp. 1,5, Jan. 10-13, 2009, [Retrieved from the Internet] <http://ieeexplore.ieee.org/stamp/stamp.jsp?tp=&arnumber=4784726>.*

International Search Report (in Chinese with English translation) and Written Opinion (in Chinese) for PCT/CN2011/082847, mailed Feb. 23, 2012; ISA/CN.

* cited by examiner

DEVICE AND METHOD FOR AUTOMATIC DRIVER INSTALLATION

CROSS-REFERENCE TO RELATED APPLICATIONS

This application is a 371 U.S. National Stage of International Application No. PCT/CN2011/082847 filed on Nov. 24, 2011, which claims priority to Chinese Patent Application No. 201010566890.4 filed on Nov. 25, 2010. Both the international application and the Chinese application are incorporated herein by reference in their entireties.

FIELD OF THE INVENTION

The present invention relates to computer technology, and in particular to a device for automatically installing driver program by a computer and the method thereof.

BACKGROUND OF THE INVENTION

In the prior art, the purpose of designing the User Account Control (UAC) is to help the user to protect the system security better and prevent invasion of malicious software. UAC makes all accounts, including administrator account, run with standard account privilege. If operations performed by a user need administrator privilege, the user is required to get a license. The mechanism stated above causes complaint of a large quantity of users. Therefore many users choose to close the UAC, which, however, results in the systems of the users exposing to higher security risk. In conventional operating system, UAC still exists, while users have more options. Users can set up UAC with four kinds of configuration: ① Always alert a user when the user is installing software or modifying Windows system settings (which is identical to Vista system); ② alert a user when the user is installing software and do not alert the user when the user is modifying system settings (current default settings); ③ alert a user when the user is installing software but close UAC security desktop, i.e., other area of the desktop is not invalidated when alerting the user; ④ Never alert a user (the configuration is not recommended).

When installing and arranging middleware program, popping up UAC window brings bad experience to users. In addition, risk exists in UAC preset value. Malicious software only needs to inject a trusted application by itself and execute the trusted application, the malicious software can bypass the UAC. In fact, some malicious software will obtain user license by using warning message in UAC form and run freely in the system, which causes system vulnerabilities and threats system security.

From what is described above, disadvantage of the prior art is that UAC window will pop up when the middleware program is arranged and installed, which brings bad experience to users. The risk existed in UAC preset value causes vulnerabilities in the operating system and threats system security.

SUMMARY OF THE INVENTION

In order to solve the problem in the prior art, it is provided a device for automatically installing driver program and method thereof, which efficiently reduces the amount of popup of an alert window, and achieves the object of installing driver software automatically without intervention of a user.

In order to achieve the object above, it is provided a device for automatically installing driver program, which includes a remote server, a client side host and an information security device; wherein, the remote server, adapted to store information security device driver program and interface protocol program and provide service of downloading the information security device driver program and the interface protocol program for the client side host;

the client side host, adapted to communicate with the remote server, receive data information input by the information security device, download the interface protocol program or the information security device driver program from the remote server according to the data information, and load or install the interface protocol program or the information security device driver program;

the information security device, adapted to communicate with the client side host and return the data information to the client side host according to an instruction issued by the client side host.

Furthermore, the remote server includes a first interface module, a first storing module and a first servo module; wherein the first interface module, adapted to connect the remote server to the client side host;

the first storing module, adapted to store the information security device driver program and the interface protocol program, which includes a driver program index code storing unit, adapted to store a driver program index code of the information security device, a driver program storing unit, adapted to store the information security device driver program indexed to the information security device and an interface protocol program storing unit, adapted to store the interface protocol program indexed to the information security device;

the first servo module, adapted to perform data communication between the remote server and the client side host, which includes a second data packet processing unit, adapted to process the driver program index code in a second data packet sent by the client side host and determine whether the driver program index code is correct, a downloading unit, adapted to download the information security device driver program corresponding to the driver program index code and send the information security device driver program to the client side host, and an index unit, adapted to index the information security device driver program in a first database.

Furthermore, the client side host includes a second interface module, a second servo module, a second storing module and a third interface module; wherein the second interface module, adapted to connect the client side host and the remote server;

the second servo module, adapted to implement data communication among the client side host, the remote server and the information security device, which includes an identifying unit, adapted to identify the driver program index code of the information security device and an interface standard used by the information security device, a configuring unit, adapted to configure copied installation file object path, a directory name of an installation file, a name of the installation file and the name of the information security device at a client side host device manager, a first data packet processing unit, adapted to process the driver program index code in a first data packet sent from the information security device and send the driver program index code to the remote server, a registry programming unit, adapted to program an installation file registry of the information security device driver program, a driver program installing unit, adapted to install the information security device driver program downloaded from the remote server, an installation file copying unit, adapted to copy the installation file in an installation file storing unit, an driver program file quoting unit, adapted to quote a default driver file of the operating system and a node corresponding to node of the driver file, and a determining unit, adapted to determine a type of the operating system of the installation system of the driver program and determine whether the interface protocol is loaded successfully;

the second storing module, adapted to store data information of the client side host, which includes a first protocol storing unit, adapted to store an operating instruction issued by the client side host to the information security device via the interface protocol, a second data packet storing unit, adapted to store a second data packet containing the driver program index code generated by processing the first data packet by the first data packet processing unit, the installation file storing unit, adapted to store the installation file of the driver program, and a registry storing unit, adapted to store registry information programmed by the registry programming unit, wherein the first data packet is received by the client side host from the information security device;

the third interface module, adapted to connect the client side host and the information security device.

Furthermore, the information security device includes a fourth interface module, a third servo module and a third storing module; wherein the fourth interface module, adapted to connect the information security device and the client side host;

the third servo module, adapted to perform data communication between the information security device and the client side host, which includes a first protocol processing unit, adapted to process the operating instruction issued by the client side host and send the data information to the client side host; and the third storing module, adapted to store the data information of the information security device, which includes a first data packet storing unit, adapted to store the first data packet and send the first data packet to the client side host.

A method for automatically installing driver program, which includes following steps:

step A, establishing, by an information security device, a connection to a client side host;

step B, loading, by the client side host, interface protocol program stored at a remote server after identifying an interface standard used by the information security device;

step C, receiving, by the information security device, an operating instruction issued by the client side host and send a first data packet to the client side host according to the operating instruction; extracting, by the client side host, a driver program index code from the first data packet and send the driver program index code to the remote server;

step D, searching, by the remote server, information security device driver program in a first storing module according to the driver program index code and downloading the searched information security device driver program to the client side host;

step E, copying, by the client side host, an installation file data packet, programming a registry and information security device attribute, quoting a node corresponding to a default driver file of an operating system of the client side host so as to complete configuration and installation of the information security device driver program.

Here, the information security device is a USB Chip/Smart Card Interface Device, CCID, the interface protocol is a Personal Computer/smart card, PS/SC, interface protocol and the operating instruction is an Application Protocol Data Unit, APDU, instruction.

If the loading, by the client side host, the interface protocol program stored at the remote server is successful, going to step C; otherwise prompting, by the operating system, error information.

Furthermore, the step D includes:

determining whether the driver program index code exists in the first database and is correct;

downloading, by the remote server, the information security device driver program corresponding to the driver program index code in the first storing module to the client side host, if the driver program index code exists and is correct;

sending, by the remote server, error information to the client side host, if the driver program index code does not exist and/or is incorrect.

Furthermore, the step E includes:

step E1, obtaining, by the client side host, information security device driver program attribute according to an information security device driver program configuration text; establishing a copied installation file storage path, a directory name of an installation file, a name of the installation file, a name of the information security device at a client side host device manager; and marking a type of a driver program installation operating system and a name of a hardware driver;

step E2, determining, by the client side host, the type of the installation driver program operating system type, if the type is a first driver program installation operating system, going to step E3; if the type is a second driver program installation operating system, going to step E4;

step E3, copying, by the client side host, a first installation file data packet according to an information security device driver program configuration text node, programming a first registry data packet and the information security device attribute so as to complete the installation of the information security device driver program;

step E4, copying, by the client side host, a second installation file data packet according to the information security device driver program configuration text node, programming a second registry data packet and the information security device attribute, quoting the node corresponding to the default driver file of the operating system of the client side host so as to complete the installation of the information security device driver program.

Here, the driver program attribute includes a class name of the information security device driver program, a class globally unique identifier, GUID, value of the information security device driver program, a name of an installation file provider, a name of a driver program path file and a driver program number.

In the step E2, a basis of determining the type of the driver program installation operating system is a version number of the operating system.

In the step E3, the first installation file data packet is an installation file under a driver program installation system configuration installation node; the first registry data packet includes an information security device attribute registry, a Cryptographic Service Providing program attribute registry and a shield registry; wherein the information security device attribute registry includes an automatic identification code of the information security device, an identifier of the automatic identification code, a name of a cryptographic service provider, a name of a hardware smart card provider and a quoting driver program module;

the cryptographic service providing program attribute registry includes a signature, a type and a storage path of the cryptographic service providing program;

the shield registry is for shielding an icon of the smart card on a control board of the operating system and displaying an icon of the information security device on the control board only;

the information security device driver program attribute is a driver attribute configuration text which makes the information security device and the client side host connected with each other automatically.

In the step E4, the second installation file data packet includes a system configuration installation file, a configuration interface English language installation file, a configuration interface Chinese language installation file, a configuration interface traditional Chinese language installation file, a cryptographic service provider program configuration installation file, a management tool installation file, a management tool interface language installation packet, a help document installation file and a user custom control installation file;

the second registry data packet includes the first registry data packet, an automatic play interface registry and an autoplay interface identifier;

the autoplay interface registry includes a name of a autoplay interface, an icon of the autoplay interface and an identifier of the autoplay interface;

the configuration tool registry includes: configuring a tool name, installing a configuration text path, installing configuration text content, installing a configuration text class, installing a configuration text, installing a file provider name, a time data packet of the driver program, date of the driver program, a version number of the driver program, the driver program index code and the icon of the driver program;

the quoting the node corresponding to the default driver file of the operating system of the client side host includes: quoting a register service node of the default driver file, quoting a register hardware information node of the default driver file, quoting a configuration information security device driver program management tool node of the default driver file and quoting a configuration information security device driver program interface node of the default driver file.

The technical solution provided by the present invention has the advantages of avoiding the control of a user account when arranging middleware program and reducing the amount of popup of alter windows and achieving automatic installation of driver program without participation of a user. The security of the operating system is ensured and reducing the amount of popup of alert windows without closing the control of the user account so as to simplify user operation.

DETAILED DESCRIPTION OF THE EMBODIMENTS

Detailed description of specific embodiments is illustrated in cooperation of accompanying drawings of the specification.

Embodiment 1

USB key is taken as an example of an information security device in the embodiment.

The information security device refers to a device with a processor and a storage, which has a built-in smart chip; the information security device ensures that inner data is not obtained illegally and has capability of programming and computing as well.

Figure 1:
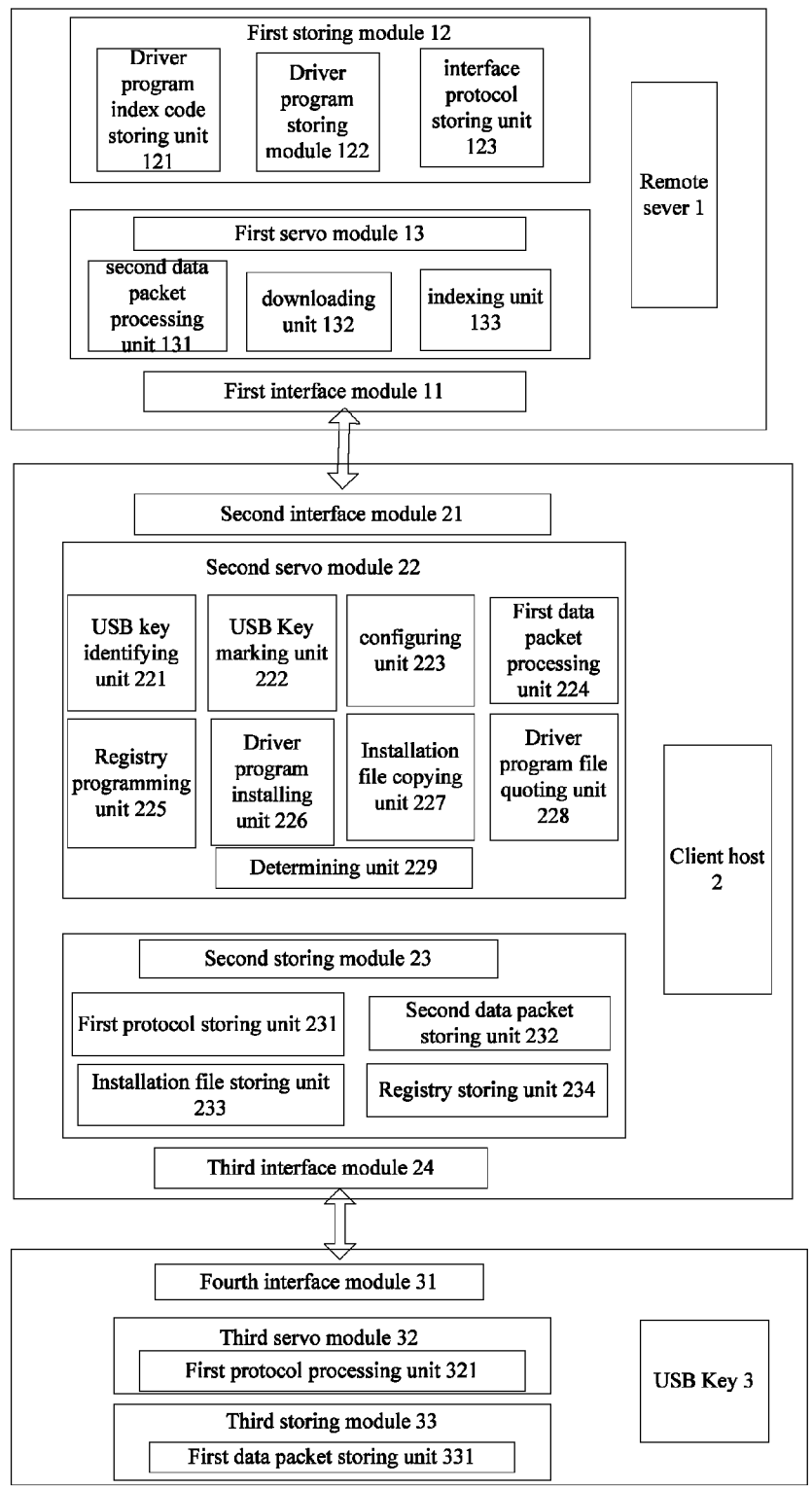
FIG. 1 is a function diagram illustrating a device for automatically installing driver program according to Embodiment 1 of the present invention.

According to Embodiment 1, it is provided a device for automatically installing driver program. Referring to FIG. 1, the device may include a remote server 1, a client side host 2 and a USB key 3.

The remote sever 1 includes a first interface module 11, a first storing module 12 and a first servo module 12. Here, the first interface module 11 is adapted to connect the remote server 1 and the client side host 2;

the first storing module 12 is adapted to store information security device driver program and interface protocol program, which specifically includes a driver program index code storing unit 121, a driver program storing unit 122 and an interface protocol program storing unit 123; here, the driver program index code storing unit 121 is adapted to store a driver program index code of the USB key 3 and specifically the driver program index code is an alphanumeric identifier for indicating the uniqueness of installation of a product; the driver program storing unit 122 is adapted to store the driver program indexed to the USB Key 3; the interface protocol storing unit 123 is adapted to store the interface protocol program indexed to the USB key;

the first servo module 13 is adapted to provide a data interaction channel between the remote server 1 and the client side host 2, which specifically includes a second data packet processing unit 131, a downloading unit 132 and an index unit 133; here, the second data packet processing unit 131 is adapted to process a driver program index code in a second data packet sent from the client side host 2 and determine whether the driver program index code is correct; the downloading unit 132 is adapted to download driver program corresponding to the driver program index code of the USB key 3 and send the downloaded driver program to the client side host 2; the index unit 133 is adapted to index the driver program index code of the USB key 2 in a first database by the remote server 1.

The client side host 2 includes a second interface module 21, a second servo module 22, a second storing module 23 and a third interface module 24;

the second interface module 21 is adapted to connect the client side host 2 and the remote server 1;

the second servo module 22 is adapted to provide a channel for data interaction among the client side host 2, the remote server 1 and the USB key 3, which specifically includes a USB key identifying unit 221, a USB Key marking unit 222, a configuring unit 223, a first date packet processing unit 224, a registry programming unit 225, a driver program installing unit 226, an installation file copying unit 227, a driver program file quoting unit 228 and a determining unit 229;

the USB key identifying unit 221 is adapted to identify an interface standard used by the USB Key 3 and the driver program code of the USB Key 3 by the client side host 2;

the USB Key marking unit 222 is adapted to mark a type of a driver program installation operating system and a name of the USB Key 3;

the configuring unit 223 is adapted to configure an object path of a copied installation file, a directory name of an installation file, a name of the installation file, and a name of the USB Key 3 at a client side host device manager;

the first data packet processing unit 224 is adapted to process a first data packet sent from the USB Key 3, obtain and send the driver program index code in the first data packet to the remote server 1;

the registry programming unit 225 is adapted to program a registry of a driver program installation file and send the registry of the driver program installation file to a registry storing unit 234;

the driver program installing unit 226 is adapted to install the driver program downloaded from the remote server 1;

the installation file copying unit 227 is adapted to copy the installation file in an installation file storing unit 233 by the client side host 2;

the driver program file quoting unit 228 is adapted to quote a default driver file of the operating system and a node corresponding to the default driver file;

the determining unit 229 is adapted to determine a type of the operating system of installing the USB key driver program and determine whether loading the interface program protocol is successful;

the second storing module 23 is adapted to store information data of the client side host 2; here, the second storing unit 23 specifically includes a first protocol storing unit 231, a second data storing unit 232, the installation file storing unit 233 and a registry storing unit 234.

The first protocol storing unit 231 is adapted to store an APDU instruction issued by the client side host 2 to the USB Key 3 via a PC/SC protocol; here, the APDU instruction is an application protocol data unit instruction;

the second data packet storing unit 232 is adapted to store the first data packet received from the USB Key 3 by the client side host 2, and a second data packet, which contains the driver program index code and generated by the processing of the first data packet processing unit 224;

the installation file storing unit 233 is adapted to store the driver program installation file;

the registry storing unit 234 is adapted to store information of the registry programmed by the registry programming unit 225;

the third interface module 24 is adapted to connect the client side host 1 and USB Key 3.

The USB Key 3 includes a fourth interface module 31, a third servo module 32 and a third storing module 33; here, the fourth interface module 31 is adapted to connect the USB Key 3 and the client side host 2;

the third servo module 32 is adapted to provide a channel for data interaction between the USB Key 3 and the client side host 2; here, the third servo module 32 specifically includes a first protocol processing unit 321, adapted to process the APDU instruction issued by the client side host 2 and send data information to the client side host 2;

the third storing module 33, adapted to store USB Key data packet; here, the third storing module 33 specifically includes a first data packet storing unit 331;

the first data packet storing unit 331 is adapted to store the first data packet and send the first data packet to the client side host 2.

Embodiment 2

Figure 2:
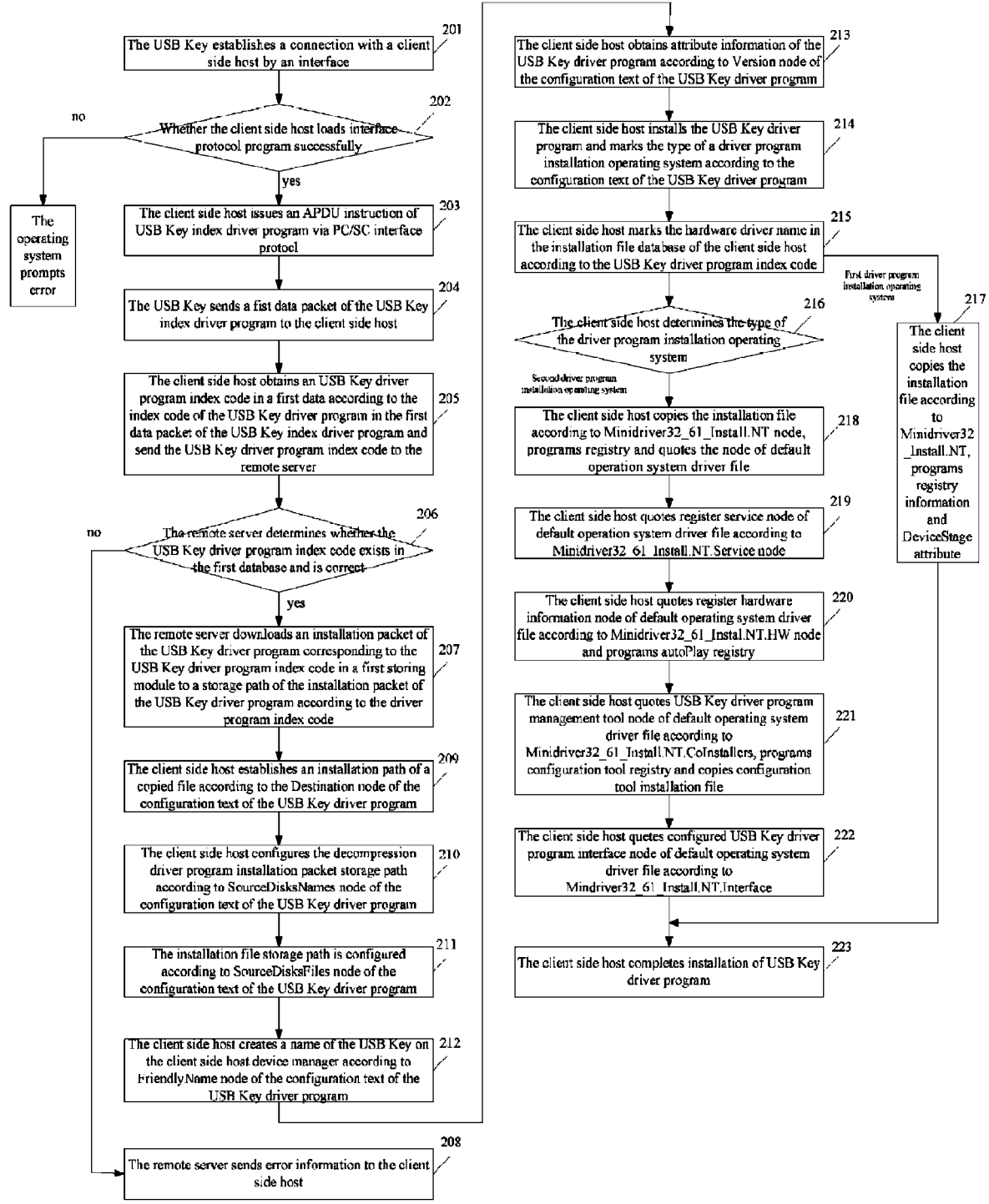
FIG. 2 is a flowchart of illustrating a method for automatically installing driver program according to Embodiment 2 of the present invention.

According to Embodiment 2, it is provided a method for automatically installing driver program. Referring to FIG. 2, the method specifically includes following steps:

USB Key is taken as an example of an information security device in the embodiment.

Step 201, the USB Key establishes a connection to a client side host by an interface; the USB Key declares that it is a USB Chip/Smart Card Interface Device, CCID, to the client side host when the connection is establishing.

Step 202, the client side host loads interface protocol program stored at a remote server such that the client side host supports Personal Computer/Smart Card, PC/SC, interface protocol; if the loading of the interface protocol program stored at the remote server is successful, step 203 is executed; otherwise, the operating system prompts error. Here, the PC/SC interface protocol is a standard user interface protocol (API) of WINDOWS platform and provides an integrated environment for a personal computer and a smart card.

Step 203, the client side host issues an APDU instruction of USB Key index driver program to the USB Key via the PC/SC interface protocol; here, the APDU instruction of the USB Key index driver program refers to an application protocol data unit instruction and specifically is 00 ca 7f 68 00.

Step 204, after the USB Key received the APDU instruction of the USB Key index driver program, the USB Key sends a first data packet of the USB Key index driver program to the client side host;

in the step 204 of the embodiment, specifically an instruction contained in the first data packet of the USB Key index driver program is as the following:

30 2f 02 01 00 16 04 4d 53 46 54 30 24 04 10 82 7b 76 f0 80 3c 94 42 b5 16 13 0b 75 a6 14 47 04 10 7d 84 89 0f 7f c3 6b bd 4a e9 ec f4 8a 59 eb b8 90 00;

here, 47 04 10 7d 84 89 0f 7f c3 6b is the index code of the USB Key driver program.

Step 205, the client side host obtains a USB Key driver program index code in a first database according to the index code of the USB Key driver program in the first data packet of the USB Key index driver program and sends the USB Key driver program index code to the remote server;

in the step 205 of the embodiment, the USB Key driver program index code specifically is

SCFILTER/CID_F0767B82-3C80-4294-B516-130B75A61447.

Step 206, after the remote server receives the USB Key driver program, the remote server determines whether the USB Key driver program index code exists in the first database and is correct; if the USB Key driver program index code exists and is correct, step 207 is executed; otherwise, step 208 is executed;

in the step 206 of the embodiment, the first database is for storing the data integration of the USB Key driver program index code, an installation file and registry.

Step 207, the remote server downloads an installation packet of the USB Key driver program corresponding to the USB Key driver program index code in a first storing module to a storage path of the installation packet of the USB Key driver program according to the driver program index code;

in the step 207 of the embodiment, the storage path of the installation packet of the USB Key driver program indicates where the installation packet of the USB Key driver program is stored in the client side host. The installation packet of the USB Key driver program includes an installation file of the USB Key driver program, a registry of the USB Key driver program and a configuration text of the USB Key driver program.

Step 208, the remote server sends error information to the client side host.

Step 209, the client side host establishes an installation path of a copied file according to the Destination node of the configuration text of the USB Key driver program;

specifically, the installation path of system_CopyFiles (system configuration installation) file, the installation path of CoInstaller_CopyFiles (configuration tool installation) file and the installation path of CSP_CopyFiles (middleware configuration installation) file are driver program installation paths;

the installation path of CertD_CopyFiles (management tool installation) and the installation path of Doc_CopyFiles (help file installation) are user application installation paths;

the installation path of Lang_CopyFiles (management tool interface language installation packet) is a sub-directory in the user application installation path;

the installation path of Active_CopyFiles (user custom control installation) is a user control installation path;

the installation path of Copymetadata (interface language installation) installation path is an interface language installation path.

Step 210, the client side host configures a first level decompression driver program installation packet storage path, a second level decompression driver program installation packet storage path and a third level decompression driver program installation packet storage path according to Source-DisksNames node of the configuration text of the USB Key driver program;

in the step 210, the second level decompression driver program installation packet storage path is a sub-path of the first level decompression driver program installation packet storage path, the third level decompression driver program installation packet storage path is a sub-path of the second level decompression driver program installation packet storage path.

Step 211, system_CopyFiles (system configuration installation), CoInstaller_CopyFiles (configuration tool installation), and CSP_CopyFiles (middleware configuration installation) are stored in the first level decompression driver program installation packet storage path according to Source-DisksFiles node of the configuration text of the USB Key driver program;

CertD_CopyFiles (management tool installation), Doc_CopyFiles (help file installation) and Active_CopyFiles (user custom control installation) are stored in the second level decompression driver program installation storage path;

Lang_CopyFiles (management tool interface language installation packet) and Copymetadata (interface language installation) are stored in the third level decompression driver program installation storage path.

Step 212, the client host creates a name of the USB Key on the client side host device manager according to FriendlyName node of the configuration text of the USB Key driver program.

Step 213, the client side host obtains attribute information of the USB Key driver program according to Version node of the configuration text of the USB Key driver program; the attribute information includes Class (class name of the USB Key driver program), ClassGuid (class identifier of the USB Key driver program, i.e. class GUID value of the information security device), Provide (name of a installation file provider), CatalogFile (file name of the driver program path file) and DriverVer (driver program number), in which the GUID is a Globally Unique Identifier.

Step 214, the client side host installs the USB Key driver program and marks the type of a driver program installation operating system according to the configuration text of the USB Key driver program, marks NTx86 as a first driver program installation operating system and marks NTx86.6.1 as a second driver program installation operating system.

Step 215, the client side host marks Minidriver1_Install as a hardware driver name of the first driver program installation operating system and marks Minidriver2_Install as a hardware driver name of the second driver program installation operating system in an installation file database of the client side host according to the USB Key driver program index code.

Step 216, after decompressing the installation packet of the USB Key driver program stores in the storage path of the installation packet of the USB Key driver program, the client side host determines the type of the driver program installation operating system; if the driver program installation operating system is the first driver program installation system, step 217 is executed; otherwise, step 218 is executed.

Step 217, the client side host copies system_CopyFiles (system configuration installation) from the first level decompression driver program installation packet storage path to the driver program installation path according to Minidriver32_Install.NT node in the configuration text of the USB Key driver program;

in the path of HKEY_LOCAL_MACHINE\SOFTWARE\Microsoft\Calais\SmartCards, the client side host programs ATR (USB Key automatic identification code), ATRMask (identifier of the USB Key automatic identification code), Crypto Provider (name of Cryptographic Service Provider), Smart Card Key Storage Provider (name of hardware smart card provider) and 80000001 (quote driver program module) of attribute registry of the USB Key;

in the path of HKEY_LOCAL_MACHINE\SOFTWARE\Microsoft\Cryptography\Defaults\Provider\EnterSafe CSP For ICBC, the client side host programs ImagePath (CSP storage path), Type (CSP type) and Signature (signature of Cryptographic Service Providing program) of CSP (name of Cryptographic Service Provider) attribute registry;

in the path of HKEY_LOCAL_MACHINE\SYSTEM\CurrentControlSet\Control\DeviceOverrides\USB#VID_096E&PID_070f\*, the client side host programs Removable (shielding display icon) of PingBi_AddReg (shield) registry;

in the path of HKEY_LOCAL_MACHINE\SOFTWARE\Microsoft\Windows NT\CurrentVersion\DeviceDisplayObjects\DeviceMetadataParsers, the client side host programs DeviceStage (device) attribute;

in the step 217 of the present embodiment, REG_BINARY is binary data, REG_SZ is single-character data and REG_DWORD is multiple-character data;

PingBi_AddReg (shield) registry is for shielding the icon of the smart card on the control panel by the operating system and displaying the icon of the information security device only on the control panel;

the data type of the Removable (shielding display icon) is REG_DWORD and the value of Removable (shield display icon) is 0x000000;

the programmed content of DeviceStage (device) is that the USB Key can automatically connect the client side host.

Step 218, the client side host copies the system_CopyFiles (system configuration installation) from the first level decompression driver program installation packet storage path to the driver program installation path according to Minidriver32_61_Install.NT node in the configuration text of the USB Key driver program;

copies Copymetadata (interface language installation) from the third level decompression driver program installation packet storage path to the interface installation path;

copies CSP_CopyFiles (CSP configuration installation) from the first level decompression driver program installation packet storage path to the driver program installation path;

copies CertD_CopyFiles (management tool installation) from the second level decompression driver program installation packet storage path to the user application installation path;

copies Lang_CopyFiles (management tool interface language installation packet) from the third level decompression driver program installation packet storage path to the sub-path of the user application installation path;

copies Doc_CopyFiles (help file installation) from the third level decompression driver program installation packet storage path to the user application installation path; and copies Active_CopyFiles (user custom control installation) from the second level decompression driver program installation packet storage path to the user control installation path.

In the path of HKEY_LOCAL_MACHINE\SOFTWARE\Microsoft\Cryptography\Calais\SmartCards, the client side host programs the attribute registry of the USB Key and configures ATR (USB Key automatic identification code), ATRMask (identifier of the USB Key automatic identification code), Crypto Provider (name of a Cryptographic Service Provider name), Smart Card Key Storage Provider (name of a hardware smart card provider) and 80000001 (quote driver program module);

in the path of HKEY_LOCAL_MACHINE\SOFTWARE\Microsoft\Cryptography\Defaults\Provider\EnterSafe, the client side host programs CSP (Cryptographic Service Provider) attribute registry and configures ImagePath (CSP storage path),Type (CSP type) and Signature (signature of Cryptographic Service Provider);

in the path of HKEY_LOCAL_MACHINE\SYSTEM\CurrentControlSet\Control\DeviceOverrides\USB#VID_096E&PID_070f, the client side host programs PingBi_AddReg (shield) registry;

in the path of HKEY_LOCAL_MACHINE\SOFTWARE\Microsoft\Windows NT\CurrentVersion\DeviceDisplayObjects\DeviceMetadataParsers, the client side host programs DeviceStage (device) attribute;

the client side host quotes UmPass node of default operating system driver file in operating system quoting path;

the contents of system_Copyfiles file and PingBi_AddReg registry in the step 218 of the embodiment are consistent with that in the step of 217.

Step 219, the client side host quotes register service node of default operating system driver file umpass.inf in the client side host quoting path according to Minidriver32_61_Install.NT.Services node of the configuration text of the USB Key driver program.

Step 220, the client side host quotes register hardware information node of default operating system driver file umpass.inf in the client side host quoting path according to Minidriver32_61_Install.NT.HW node of the configuration text of the USB Key driver program;

in the path of HKEY_LOCAL_MACHINE\SYSTEM\ControlSet001\Enum\SCFILTER\CID_07a6dd59-7e4d-414d-a240-735f5548bf92\Device Parameters, the client side host programs autoPlay (autoplay interface) registry and sets play interface attribute;

in the step 220 of the embodiment, attribute of AutoPlay (name of autoplay interface) includes DeviceHandlers, Icons and Label;

here, the data type of DeviceHandlers (name of autoplay interface) is REG_SZ, the value of the DeviceHandlers is SafeHandler;

the data type of Icons (icon of autoplay interface) is REG_MULTI_SZ, the value of Icons is % systemroot %;

the data type of Label (identifier of autoplay interface) is REG_SZ, the value of Label is ICBC.

Step 221, the client side host quotes USB Key driver program management tool node of default operating system driver file umpass.inf in the client side host quoting path according to Minidriver32_61_Install.NT.CoInstallers node of the configuration text of the USB Key driver program;

in the path of HKEY_LOCAL_MACHINE\SYSTEM\CurrentControlSet\Control\Class\{990A2BD7-E738-46C7-B26F-1CF8FB9F1391}, the client side host programs CoInstaller_AddReg (configuration tool) registry and sets configuration tool attribute;

copies CoInstaller_CopyFiles (configuration tool) installation file to the driver program installation path from the first level decompression driver program installation packet storage path;

in the step 221 of the embodiment, attribute of CoInstaller_AddReg (configuration tool) includes CoInstallers32, InfPath, IncludedInfs, InfSection, InfSectionExt, ProviderName, DriverDateData, DriverDate, DriverVersion, MatchingDeviceId and DriverDesc;

here, the data type of CoInstallers32 (name of configuration tool) is REG_MULIT_SZ, and the value of CoInstallers32 is ftCoCspInst;

the data type of InfPath (installation configuration text path) is REG_SZ, the value of InfPath is oem;

the data type of InfPath (installation configuration text path) is REG_MULIT_SZ, and the value of InfPath is umpass;

the data type of InfSection (installation configuration text class) is REG_SZ and the value of InfSection is Minidriver32_61_Install;

the data type of InfSectionExt (installation configuration text) is REG_SZ, and the value of InfSectionExt is .NT;

the data type of ProviderName (name of the installation file provider) is REG_SZ, and the value of ProviderName is ICBC;

the data type of DriverDateData (driver program data packet) is REG_BINARY, and the value of DriverDateData is 00,80;

the data type of DriverDate (driver program data) is REG_SZ, and the value of DriverDate is Sep. 28, 2010;

the data type of DriverVersion (driver program version number) is REG_SZ, and the value of DriverVersion is 1.0.10.928;

the data type of MatchingDeviceId (driver program index code) is REG_SZ, and the value of MatchingDeviceId is scfilter\\cid_f0767b82-3c80-4294-b516-130b;

the data type of DriverDesc(driver program icon) is REG_SZ, and the value of DriverDesc is InterPass3000-Mini-driver.

Step 222, the client side host quotes configured USB Key driver program interface node of default operating system driver file umpass.inf in the client side host quoting path according to Minidriver32_61_Install.NT.Interfaces node of the configuration text of the USB Key driver program.

Step 223, the client side host completes installation of USB Key driver program.

The above description is preferable embodiment of the present invention only. However, the scope of the invention is not limited in this respect. Any changes or alternatives thought by one skilled in the art within the technical scope disclosed in the invention should be covered in the scope of the invention. Therefore the scope of the invention is in accordance with the scope of the claims.

What is claimed is:

1. A method for automatically installing driver program, comprising:
    step A, establishing, by an information security device, a connection to a client side host;
    step B, loading, by the client side host, interface protocol program stored at a remote server after identifying an interface standard used between the information security device and the client side host;
    step C, receiving, by the information security device, an operating instruction issued by the client side host and sending a first data packet to the client side host according to the operating instruction; extracting, by the client side host, a driver program index code from the first data packet and sending the driver program index code to a remote server;
    step D, searching, by the remote server, information security device driver program in a first storing module according to the driver program index code and downloading the searched information security device driver program to the client side host; and
    step E, copying, by the client side host, an installation file data packet, programming a registry and information security device attribute, quoting a node corresponding to a default driver file of an operating system of the client side host so as to complete configuration and installation of the information security device driver program;
    wherein the step D further comprises:
    determining whether the driver program index code exists in a first database and is correct; and
    downloading, by the remote server, the information security device driver program corresponding to the driver program index code in the first storing module to the client side host, if the driver program index code exists and is correct,
    wherein the information security device is a USB Chip/Smart Card Interface Device, CCID, or the interface standard is a Personal Computer/smart card, PS/SC, or the interface protocol program and the operating instruction is an Application Protocol Data Unit, APDU, instruction.

2. The method according to claim 1, wherein if the loading, by the client side host, the interface protocol program stored at the remote server is successful, going to step C; otherwise prompting, by an operating system error information.

3. The method according to claim 1, wherein the step D further comprises:
    sending, by the remote server, error information to the client side host, if the driver program index code does not exist and/or is incorrect.

4. The method according to claim 1, wherein the step E comprises:
    E1, obtaining, by the client side host, an information security device driver program attribute according to an information security device driver program configuration text; establishing a copied installation file storage path, a directory name of an installation file, a name of the installation file, a name of the information security device at a client side host device manager; and marking a type of a driver program installation operating system and a name of a hardware driver;
    E2, determining, by the client side host, the type of the driver program installation operating system, if the type is a first driver program installation operating system, going to step E3; if the type is a second driver program installation operating system, going to step E4;
    E3, copying, by the client side host, a first installation file data packet according to an information security device driver program configuration text node, programming a first registry data packet and the information security device attribute so as to complete the installation of the information security device driver program; and
    E4, copying, by the client side host, a second installation file data packet according to the information security device driver program configuration text node, programming a second registry data packet and the information security device attribute, quoting the node corresponding to the default driver file of the operating system of the client host so as to complete the installation of the information security device driver program.

5. The method according to claim 4, wherein the driver program attribute comprises a class name of the information security device driver program, a class globally unique identifier GUID value of the information security device driver program, a name of an installation file provider, a name of a driver program path file and a driver program number.

6. The method according to claim 4, wherein in the step E2, a basis of determining the type of the driver program installation operating system is a version number of the operating system.

7. The method according to claim 4, wherein in the step E3, the first installation file data packet is an installation file under a driver program installation system configuration installation node; the first registry data packet comprises an information security device attribute registry, a Cryptographic Service Providing program attribute registry and a shield registry; wherein:
    the information security device attribute registry comprises an automatic identification code of the information security device, an identifier of the automatic identification code, a name of a cryptographic service provider, a name of a hardware smart card provider and a quoting driver program module;
    the cryptographic service providing program attribute registry comprises a signature, a type and a storage path of the cryptographic service providing program;
    the shield registry is for shielding an icon of the smart card on a control board of the operating system and displaying an icon of the information security device on the control board only; and
    the information security device driver program attribute is a driver attribute configuration text which makes the information security device and the client side host connected with each other automatically.

8. The method according to claim 4, wherein in the step E4, the second installation file data packet comprises:
    a system configuration installation file, a configuration interface English language installation file, a configuration interface Chinese language installation file, a configuration interface traditional Chinese language installation file, a cryptographic service providing program configuration installation file, a management tool installation file, a management tool interface language installation packet, a help document installation file, and a user custom control installation file;
    the second registry data packet comprises: the first registry data packet, autoplay interface registry, and an autoplay interface identifier;
    a configuration tool registry comprises: configuring a tool name, installing a configuration text path, installing configuration text content, installing a configuration text class, installing a configuration text, installing a file provider name, a time data packet of the driver program, a date of the driver program, a version number of the driver program, the driver program index code and an icon of the driver program; and the quoting the node corresponding to the default driver file of the operating system of the client side host comprises: quoting a register service node of the default driver file, quoting a register hardware information node of the default driver file, quoting a configuration information security device driver program management tool node of the default driver file and quoting a configuration information security device driver program interface node of the default driver file.

9. A device for automatically installing driver program, comprising a remote server, a client side host, and an information security device; wherein:

the remote server, adapted to store an information security device driver program and an interface protocol program, and provide service of downloading the information security device driver program and the interface protocol program for the client side host;

the client side host, adapted to communicate with the remote server, receive data information input by the information security device, download the interface protocol program or the information security device driver program from the remote server according to the data information, and load or install the interface protocol program or the information security device driver program; and the information security device, adapted to communicate with the client side host using an interface standard and return the data information to the client side host according to an operating instruction issued by the client side host;

wherein the remote server comprises a first servo module, adapted to perform data communication between the remote server and the client side host, which comprises a second data packet processing unit, adapted to process a driver program index code in a second data packet sent by the client side host and determine whether the driver program index code is correct, a downloading unit, adapted to download the information security device driver program corresponding to the driver program index code and send the information security device driver program to the client side host, and an index unit, adapted to index the information security device driver program in a first database; and wherein the information security device is a USB Chip/Smart Card Interface Device, CCID, or the interface standard is a Personal Computer/smart card, PS/SC, or the interface protocol program and the operating instruction is an Application Protocol Data Unit, APDU, instruction.

10. The device according to claim 9, wherein the remote server comprises a first interface module and a first storing module; wherein the first interface module, adapted to connect the remote server to the client side host; and the first storing module, adapted to store the information security device driver program and the interface protocol program, which comprises a driver program index code storing unit, adapted to store a driver program index code of the information security device, a driver program storing unit, adapted to store the information security device driver program indexed to the information security device and an interface protocol program storing unit, adapted to store the interface protocol program indexed to the information security device.

11. The device according to claim 9, wherein the client side host comprises a second interface module, a second servo module, a second storing module, and a third interface module; wherein:

the second interface module, adapted to connect the client side host and the remote server;

the second servo module, adapted to implement data communication among the client side host, the remote server and the information security device, which comprises: an identifying unit, adapted to identify a driver program index code of the information security device and the interface standard used by the information security device, a marking unit, adapted to mark a type of a driver program installation operating system and a name of the information security device, a configuring unit, adapted to configure copied installation file object path, a directory name of an installation file, a name of the installation file and the name of the information security device at a client side host device manager, a first data packet processing unit, adapted to process the driver program index code in a first data packet sent from the information security device and send the driver program index code to the remote server, a registry programming unit, adapted to program an installation file registry of the information security device driver program, a driver program installing unit, adapted to install the information security device driver program downloaded from the remote server, an installation file copying unit, adapted to copy an installation file in an installation file storing unit, an driver program file quoting unit, adapted to quote a default driver file of the operating system and a node corresponding to the default driver file, and a determining unit, adapted to determine a type of the operating system of installing the driver program and determine whether the interface protocol is loaded successfully;

the second storing module, adapted to store data information of the client side host, which comprises a first protocol storing unit, adapted to store the operating instruction issued by the client side host to the information security device via the interface protocol, a second data packet storing unit, adapted to store a second data packet containing the driver program index code generated by processing a first data packet by a first data packet processing unit, the installation file storing unit, adapted to store the installation file of the driver program, and a registry storing unit, adapted to store registry information programmed by the registry programming unit, wherein the first data packet is received by the client side host from the information security device; and the third interface module, adapted to connect the client side host with the information security device.

12. The device according to claim 9, wherein the information security device comprises: a fourth interface module, a third servo module, and a third storing module; wherein:

the fourth interface module, adapted to connect the information security device with the client side host;

the third servo module, adapted to perform data communication between the information security device and the client side host, which comprises: a first protocol processing unit, adapted to process the operating instruction issued by the client side host and send the data information to the client side host; and the third storing module, adapted to store the data information of the information security device, which comprises: a first data packet storing unit, adapted to store a first data packet and send the first data packet to the client side host.

* * * * *